United States Patent
Cuichun

(10) Patent No.: US 10,222,472 B2
(45) Date of Patent: Mar. 5, 2019

(54) SYSTEM AND METHOD FOR DETECTING HEADING AND VELOCITY OF A TARGET OBJECT

(71) Applicant: Veoneer US, Inc., Southfield, MI (US)

(72) Inventor: Xu Cuichun, N. Billerica, MA (US)

(73) Assignee: Veoneer US, Inc., Southfield, MI (US)

( * ) Notice: Subject to any disclaimer, the term of this patent is extended or adjusted under 35 U.S.C. 154(b) by 308 days.

(21) Appl. No.: 15/282,218

(22) Filed: Sep. 30, 2016

(65) Prior Publication Data

US 2018/0095171 A1 Apr. 5, 2018

(51) Int. Cl.

| | |
|---|---|
| *G01S 13/62* | (2006.01) |
| *G01S 13/93* | (2006.01) |
| *G01S 13/66* | (2006.01) |
| *G01S 17/93* | (2006.01) |
| *G01S 17/58* | (2006.01) |
| *G01S 17/66* | (2006.01) |
| *G01S 13/58* | (2006.01) |
| *G01S 13/72* | (2006.01) |
| *G01S 13/00* | (2006.01) |
| *G01S 17/00* | (2006.01) |

(52) U.S. Cl.
CPC .......... *G01S 13/931* (2013.01); *G01S 13/584* (2013.01); *G01S 13/589* (2013.01); *G01S 13/66* (2013.01); *G01S 13/72* (2013.01)

(58) Field of Classification Search
None
See application file for complete search history.

(56) References Cited

U.S. PATENT DOCUMENTS

| | | | | |
|---|---|---|---|---|
| 5,574,463 | A * | 11/1996 | Shirai | G01S 13/93 342/115 |
| 5,754,099 | A * | 5/1998 | Nishimura | G01S 13/931 340/435 |
| 6,002,983 | A * | 12/1999 | Alland | G01S 13/931 342/70 |
| 6,628,227 | B1 * | 9/2003 | Rao | G01S 13/931 342/70 |
| 2005/0122251 | A1 * | 6/2005 | Shimomura | G01S 13/931 342/70 |

(Continued)

OTHER PUBLICATIONS

International Search Report in corresponding International Application No. PCT/US17/48440, dated Jan. 2, 2018.

(Continued)

*Primary Examiner* — Bernarr E Gregory
(74) *Attorney, Agent, or Firm* — Burns & Levinson, LLP; Steven M. Mills

(57) ABSTRACT

A system for characterizing a moving object performs a cluster trajectory orientation process associated with clusters of detected points in each of a set of scans to estimate the heading of a non-point target. The cluster trajectory orientation process performs a principal component analysis on a corresponding position data matrix representing coordinates of the clusters of points for each of a set of scans and compares resulting eigenvectors to a heading of the cluster averages to generate a heading estimate. The heading estimate is combined with velocity estimates from a point target based tracking process and a Doppler-azimuth profile process in a weighted combination based on target attributes to improve the accuracy and performance of the system.

20 Claims, 6 Drawing Sheets

(56) References Cited

U.S. PATENT DOCUMENTS

| | | | |
|---|---|---|---|
| 2006/0066474 A1* | 3/2006 | Shirakawa | G01S 7/032 342/147 |
| 2007/0008211 A1* | 1/2007 | Yannano | G01S 13/931 342/70 |
| 2007/0024494 A1 | 2/2007 | Dizaji | |
| 2008/0042895 A1* | 2/2008 | Inaba | G01S 13/931 342/112 |
| 2008/0224918 A1* | 9/2008 | Shimizu | G01S 13/931 342/147 |
| 2009/0079617 A1* | 3/2009 | Shirakawa | G01S 13/34 342/146 |
| 2009/0121916 A1* | 5/2009 | Miyake | G01S 13/931 342/70 |
| 2009/0224978 A1* | 9/2009 | Shirakawa | G01S 13/42 342/386 |
| 2009/0304246 A1 | 12/2009 | Walker | |
| 2010/0019954 A1* | 1/2010 | Mizutani | G01S 3/74 342/147 |
| 2010/0073216 A1* | 3/2010 | Sakamoto | G01S 3/74 342/70 |
| 2010/0109937 A1* | 5/2010 | Koike | G01S 13/931 342/70 |
| 2010/0134343 A1* | 6/2010 | Nakagawa | G01S 3/74 342/147 |
| 2010/0156699 A1* | 6/2010 | Kuoch | G01S 13/931 342/70 |
| 2010/0271254 A1* | 10/2010 | Kanannoto | G01S 3/74 342/27 |
| 2010/0283663 A1* | 11/2010 | Sasabuchi | G01S 13/931 342/70 |
| 2012/0038506 A1* | 2/2012 | Kanannoto | G01S 3/74 342/158 |
| 2012/0059777 A1 | 3/2012 | Paiva | |
| 2012/0112954 A1* | 5/2012 | Kurono | G01S 3/74 342/147 |
| 2012/0242535 A1* | 9/2012 | Kanamoto | G01S 3/74 342/158 |
| 2012/0249360 A1* | 10/2012 | Kanamoto | G01S 3/74 342/158 |
| 2012/0268313 A1* | 10/2012 | Shimizu | G01S 13/931 342/107 |
| 2012/0268316 A1* | 10/2012 | Kanamoto | G01S 3/74 342/158 |
| 2013/0030769 A1* | 1/2013 | Asanuma | G01S 3/74 702/189 |
| 2015/0145714 A1* | 5/2015 | Watanabe | G01S 13/931 342/107 |
| 2015/0331086 A1* | 11/2015 | Hassen | G01S 13/42 342/175 |
| 2015/0369912 A1* | 12/2015 | Kishigami | G01S 13/931 342/113 |
| 2016/0084941 A1* | 3/2016 | Arage | G01S 13/931 342/91 |
| 2016/0084943 A1* | 3/2016 | Arage | G01S 13/931 342/102 |
| 2016/0084944 A1* | 3/2016 | Bialer | G01S 13/931 342/70 |
| 2016/0170020 A1* | 6/2016 | Hamada | G01S 13/66 342/70 |
| 2016/0202355 A1* | 7/2016 | Liu | G01S 13/931 342/70 |
| 2017/0067991 A1* | 3/2017 | Liu | G01S 13/58 |
| 2017/0097412 A1* | 4/2017 | Liu | G01S 13/58 |

OTHER PUBLICATIONS

Sabushimike et al., "Low-Rank Matrix Recovery Approach for Clutter Rejection in Real-Time IR-UWB Radar-Based Moving Target Detection", Sensors, 16:1-13 (2016).

\* cited by examiner

SYSTEM AND METHOD FOR DETECTING HEADING AND VELOCITY OF A TARGET OBJECT

FIELD OF TECHNOLOGY

The present disclosure relates to the field of object detection and tracking systems, and more particularly to the field of radar and LIDAR processing systems and methods.

BACKGROUND

Conventional object detection and tracking systems that include high resolution radar apparatus or LIDAR apparatus, for example, are generally implemented to track the position of objects in their field of view and estimate the velocity of detected objects. Such conventional object detection and tracking systems are generally configured for identifying and tracking target objects based on a point object model, which assumes that the system receives only one valid detection of a signal reflected from the target object. However, when a non-point object that has some substantial size and/or extended shape is located within a close range to a high resolution radar apparatus or LIDAR apparatus, the apparatus can receive multiple valid reflections from different parts of the non-point object.

The detection of valid reflections from a non-point object can be a source of error or inaccuracy in the output of an object detection and tracking system. For example, an automotive radar system may be configured to perform target velocity estimation by sensing the position of a target at multiple times. The point-object model used by conventional automotive radar systems assumes that each sensed position of the target represents the position of the entire target at each of the multiple times. However, if the target is a large object, such as a large truck, the conventional automotive radar system may receive a reflection from and sense the position of different parts of the large truck at different times. This can introduce substantial bias into a velocity estimation performed by a traditional detection and tracking system that uses a point-object model.

SUMMARY

Aspects of the present disclosure include a system and processing method for determining heading and velocity of a moving target. The system includes a signal transmitter for transmitting transmitted signals into a region and a receiver for receiving reflected signals generated by reflection of the transmitted signals from a plurality of points on the moving target and generating receive signals indicative of the reflected radar signals. The plurality of points defines a cluster of points for each of a plurality of scans. The disclosed system also includes a processor receiving the receive signals and using a cluster trajectory orientation process associated with the cluster of points to estimate the heading and velocity of the moving target. According to an aspect of the present disclosure, the processor combines three estimated velocities of the moving target to determine the velocity of the moving target. The three velocities include a first velocity generated from a point target based tracking process, a second velocity generated from a Doppler-azimuth profile process and a third velocity generated based on the cluster trajectory orientation process.

According to another aspect of the present disclosure, the cluster trajectory orientation process includes generating a position data matrix including coordinates of each point in a corresponding cluster of points for each of the plurality of scans and generating a corresponding major eigenvector by performing a principal component analysis on a corresponding position data matrix for each of the position data matrices. An initial average coordinate set is computed as an average of the coordinates in the position data matrix corresponding to an earliest one of the plurality of scans. A final average coordinate set is computed as an average of the coordinates in the position data matrix corresponding to a latest one of the plurality of scans. A first heading estimate vector extending from the initial average coordinate set to the final average coordinate set is defined. The first heading estimate vector is compared to the major eigenvector corresponding to each of the position data matrices to identify a selected one of the major eigenvectors having an eigenvector direction that most closely matches a heading estimate vector direction of the first heading estimate vector. According to this aspect of the present disclosure, the eigenvector direction of the selected one of the major eigenvectors is generated as a cluster trajectory orientation heading estimate.

According to another aspect of the present disclosure, the third velocity generated based on the cluster trajectory orientation process is determined by combination of the cluster trajectory orientation heading estimate with the first velocity generated from the point target based tracking process or the second velocity generated from a Doppler-azimuth profile process.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Figure 1:
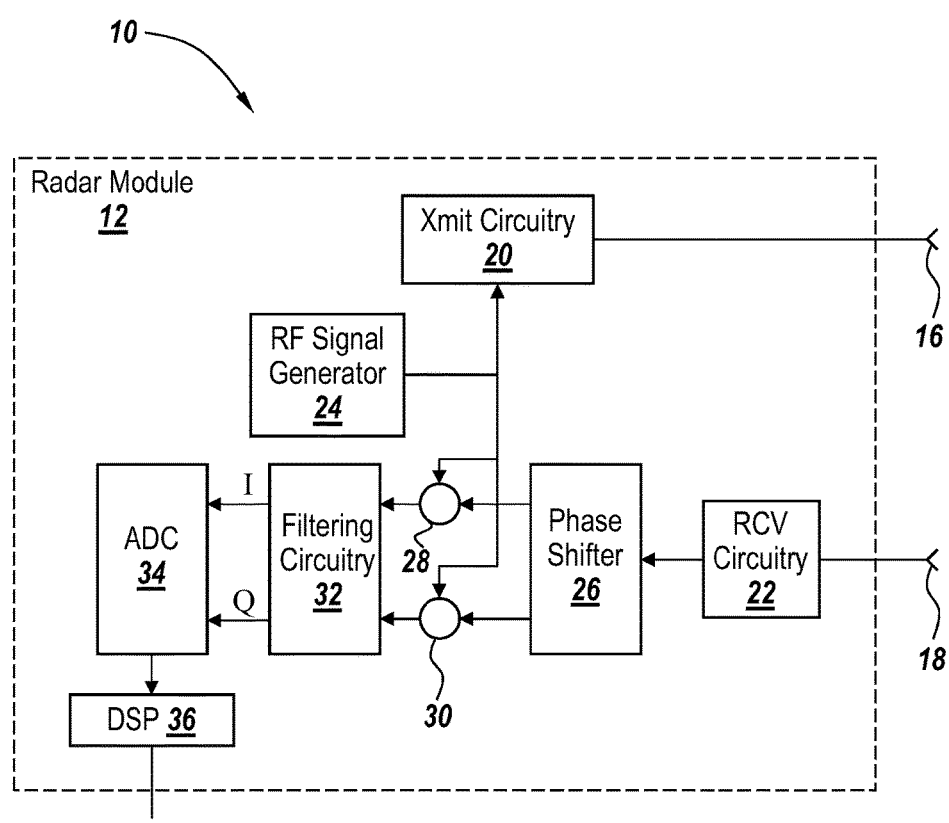
FIG. 1 includes a schematic block diagram of an automotive radar system, including one or more radar sensor modules for processing automotive radar signals, in accordance with exemplary embodiments.

According to the exemplary embodiments of the present disclosure, provided is an automotive radar system and automotive radar sensor and radar processing methods in which the undesirable effects of interference from other radar sensors are substantially reduced or eliminated. FIG. 1 includes a schematic block diagram of an automotive radar system 10, including one or more radar sensor modules 12 for processing automotive radar signals, in accordance with some exemplary embodiments. Referring to FIG. 1, radar system 10 includes one or more radar modules 12, which process radar transmit and receive signals which are compatible with radar system 10 in the host vehicle. Radar sensor module 12 generates and transmits radar signals into the region of interest adjacent to the host vehicle that is being monitored by the radar system. Generation and transmission of signals is accomplished by RF signal generator 24, radar transmit circuitry 20 and transmit antenna 16. Radar transmit circuitry 20 generally includes any circuitry required to generate the signals transmitted via transmit antenna 16, such as signal shaping/timing circuitry, transmit trigger circuitry, RF switch circuitry, RF power amplifier circuitry, or any other appropriate transmit circuitry used by radar system 10 to generate the transmitted radar signal according to exemplary embodiments described in detail herein.

Radar module 12 also receives returning radar signals at radar receive circuitry 22 via receive antenna 18. Radar receive circuitry 22 generally includes any circuitry required to process the signals received via receive antenna 18, such as RF low noise amplifier circuitry, signal shaping/timing circuitry, receive trigger circuitry, RF switch circuitry, or any other appropriate receive circuitry used by radar system 10. In some exemplary embodiments, the received signals processed by radar receive circuitry 22 are forwarded to phase shifter circuitry 26, which generates two signals having a predetermined phase difference. These two signals, referred to as an inphase (I) signal and a quadrature (Q) signal, are mixed with an RF signal from RF signal generator 24 by mixers 28 and 30, respectively, to generate I and Q intermediate frequency (IF) signals. The resulting IF signals are further filtered as required by filtering circuitry 32 to generate filtered IF I and Q signals, labeled "I" and "Q" in FIG. 1. The IF I and Q signals are digitized by analog-to-digital converter circuitry (ADC) 34. These digitized I and Q IF signals are processed by a processor, such as a digital signal processor (DSP) 36. In some exemplary embodiments, the DSP 36 can perform all of the processing required to carry out the object detection and parameter determination, including object range, bearing and/or velocity determinations, performed by system 10.

It will be understood that the system configuration illustrated in FIG. 1 is exemplary only and that other system configurations can be used to implement the embodiments described herein. For example, the ordering of filtering of the IF signal and analog-to-digital conversion may be different than the order illustrated in FIG. 1. The IF signal may be digitized before filtering, and then digital filtering may be carried out on the digitized signal(s).

Figure 2:
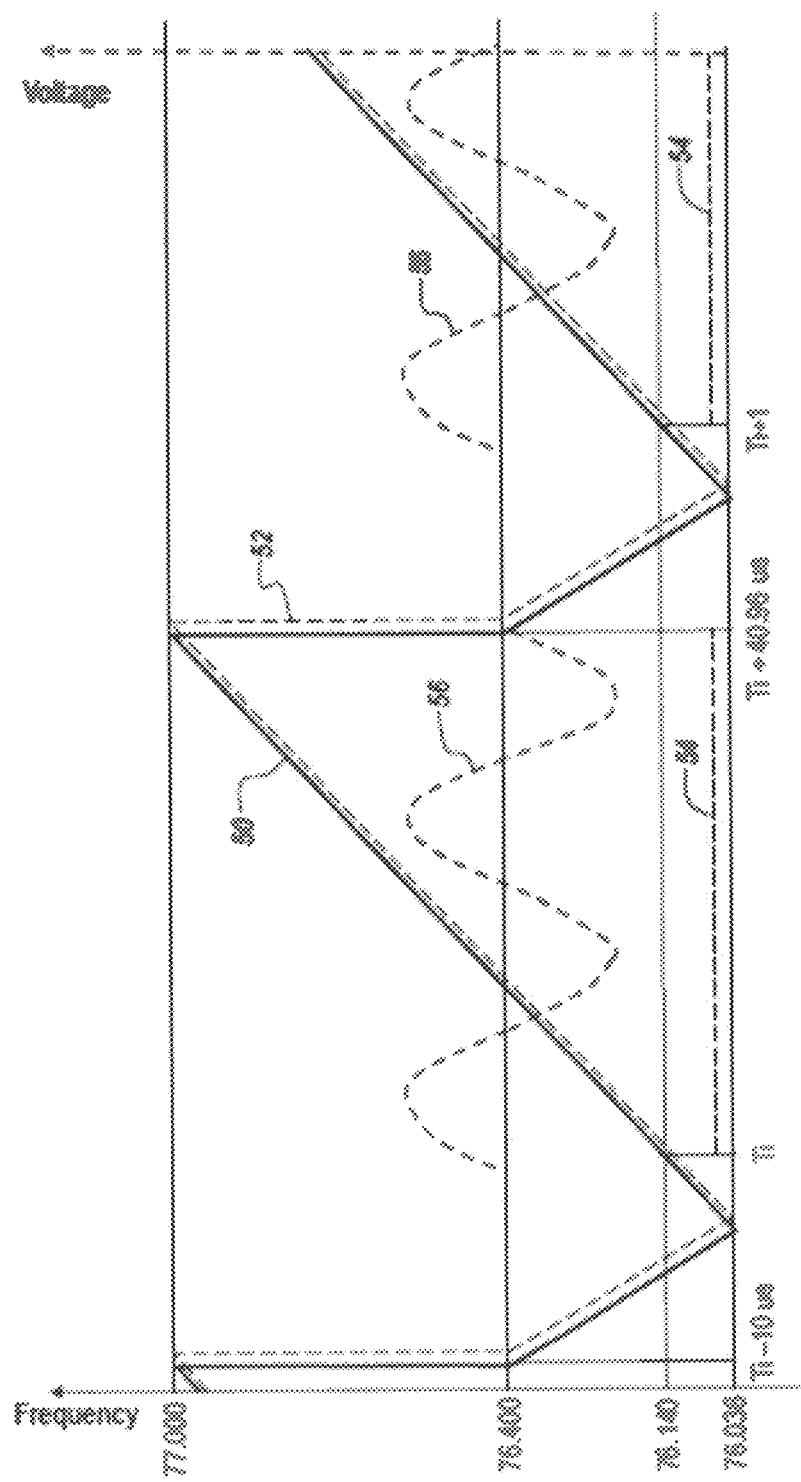
FIG. 2 includes a schematic timing diagram of signals in a conventional FMCW radar system.

According to the present disclosure, in a FMCW radar system, radar signals are transmitted into the region of interest in the form of continuous wave having a changing frequency. FIG. 2 includes a schematic timing diagram of signals in a conventional FMCW radar system. Referring to FIG. 2, transmitted radar signal 50, illustrated in a solid bold line, and the corresponding received radar signal 52, illustrated as a dashed bold line, are plotted as frequency vs. time. Curve 54 is a graph of the frequency of the IF signal, versus time. As shown in FIG. 2, the frequency of the IF signal $F_{IF}$ is the magnitude of the difference between the frequency of the transmitted signal $F_{TX}$ and the frequency of the received signal $F_{RX}$, i.e., $F_{IF} = |F_{TX} - F_{RX}|$. The IF output waveform is illustrated in curve 56 as voltage amplitude vs. time, superimposed in FIG. 2 over the frequency curves 50, 52, 54.

Referring to FIG. 2, in a conventional FMCW automotive radar system, radar signals are transmitted with a periodic linearly ramped frequency, as illustrated by curve 50. As a result, in the ideal case, a similarly linearly ramped return signal is received, shifted in time, as illustrated by curve 52. The frequency of the resulting IF signal is the difference between the frequencies of the two curves 50 and 52, which in the illustrated case is a constant. It is this IF waveform 56 that is processed to make radar detections and parameter determinations for objects in the region of interest.

In the particular exemplary waveforms illustrated in FIG. 2, the time of each linear frequency ramp is identified as $T_i$, where i is the index or number of the particular ramp. In the particular illustrations shown in FIG. 2, the frequency of a transmitted radar signal in each ramp cycle increases linearly then decreases rapidly at first and then slightly less rapidly back to the starting frequency of the next cycle. The start of a first linear frequency ramp is illustrated to being at time $T_i$, and the start of the next cycle is illustrated to begin at time $T_{i+1}$. In each radar cycle or radar scan, the system sends out many linear frequency ramps, and gets multiple detections after processing the IF waveform 56. The cycle time or scan time $T_{cyc}$ is usually much greater than the ramp time. It will be understood that the particular parameters of the frequency ramp described herein are exemplary only. The present disclosure is applicable to any sets of parameters of the frequency ramps.

As indicated above, the timing diagram of FIG. 2 illustrates the ideal case in which the received return signal 52 is due entirely to reflections of the transmitted signal 50 from objects in the region of interest. In this case, processing of the resulting IF signal 56 results in accurate object detection and parameter determination. However, in actuality, the actual received signal may be influenced by other effects, which include interference caused by reflections of radar signals transmitted by transmitters of other radar sensors, either within or external to the same radar system. As a result, the IF signal processed to make object detections and parameter determinations includes extraneous information, which results in decreased system performance.

Aspects of the present disclosure provide accurate and robust object velocity estimation, based on orientation of detection cluster trajectory using principal component analysis techniques. Although principle component analysis techniques have been used in image signal processing to estimate object orientation and/or size, these techniques generally provide an estimation that based on only one snapshot, or data from one epoch, and heretofore do not provide estimates of moving target headings, for example.

The disclosed system and method can be implemented in 77 GHz automotive radar or LIDAR object detection and tracking systems, in which one or more sensors have many detections from near range objects to middle range objects. The disclosed system and method approximates a shape of a target object by an ellipse, and estimates the heading of the target object as being in alignment with the ellipse's orientation.

According to an aspect of the present disclosure, a positive integer K is chosen depending on a sensor and/or application, such that K is not so large that objects of interest in the application will not substantially change velocity during the K scans or $K*T_{cyc}$ duration. For automotive radar applications a duration of 60 ms to 120 ms can be chosen as an appropriate example.

According to an aspect of the present disclosure, a position data matrix X is generated for the each of the K-cycles. Each of the position data matrices includes coordinates of all detection in the corresponding time period. An example of a position data matrix X is shown in equation (1) in which $x_i$ and $y_i$ are Cartesian x coordinates and y coordinates of the $i^{th}$ detection, and in which N is the total number of detections in the K-cycle. The superscript represents cycle number. In this example, there are 3 detections in the first cycle, 2 detections in the second cycle, . . . , and 3 detections in the Kth cycle.

$$X = \begin{bmatrix} x_1^{(1)} & x_2^{(1)} & x_3^{(1)} & x_4^{(2)} & x_5^{(2)} & \cdots & x_{N-2}^{(K)} & x_{N-1}^{(K)} & x_N^{(K)} \\ y_1^{(1)} & y_2^{(1)} & y_3^{(1)} & y_4^{(2)} & y_5^{(2)} & \cdots & y_{N-2}^{(K)} & y_{N-1}^{(K)} & y_N^{(K)} \end{bmatrix}.$$ Equation (1)

According to an aspect of the present disclosure, a principle component analysis is then performed on the position data matrix. In one example embodiment, according to an aspect of the present disclosure, the principle component analysis may include performing an eigenvector decomposition a correlation matrix M, in which M is defined according to equation 2.

$$M = \frac{1}{N} X X^T.$$ Equation (2)

In equation 2, $X^T$ is the transpose of the corresponding position data matrix X. The eigenvector decomposition generally produces two resulting vectors in which one of the resulting vectors is an eigenvector corresponding to a largest eigenvalue of the corresponding correlation matrix, and another resulting vector is an eigenvector corresponding to a smallest eigenvalue of the corresponding correlation matrix. The eigenvector corresponding to the largest eigenvalue of M is referred to herein as the major eigenvector of M. The eigenvector corresponding to the smallest eigenvalue of M is referred to herein in as the minor eigenvalue of M. The major eigenvector of M provides the most information about the target heading, but by itself does not completely indicate the target heading because the target heading could be in a direction coinciding with either end of the major eigenvector. According to an aspect of the present disclosure, a heading estimate vector is computed based on position data to select the orientation, i.e. identify the arrow end, of the major eigenvector that indicates the target direction.

The position data matrix X that includes coordinates of detections during the earliest of the time periods is referred to herein as $X_{oldest}$, and the position data matrix that includes coordinates of detections during the latest of the time periods is referred to herein as $X_{latest}$. For example according to equation 1, $$X_{oldest} = \begin{bmatrix} x_1^{(1)} & x_2^{(1)} & x_3^{(1)} \\ y_1^{(1)} & y_2^{(1)} & y_3^{(1)} \end{bmatrix} \text{ and } X_{latest} = \begin{bmatrix} x_{N-2}^{(K)} & x_{N-1}^{(K)} & x_N^{(K)} \\ y_{N-2}^{(K)} & y_{N-1}^{(K)} & y_N^{(K)} \end{bmatrix}$$

According to an aspect of the present disclosure, an average x coordinate and average y coordinate of all of the x and y coordinates in $X_{oldest}$ is computed and denoted $(x,y)_{oldest}$, and an average x coordinate and average y coordinates of all of the x and y coordinates in $X_{latest}$ is computed and denoted $(x,y)_{latest}$. A first heading estimate vector is defined as a vector extending from $(x,y)_{oldest}$ to $(x,y)_{latest}$. According to an aspect of the present disclosure, the first heading estimate vector is compared to the major eigenvector, i.e. the major eigenvector of M based on the position data matrix X of the K-cycle.

According to an aspect of the present disclosure, the direction of the major eigenvector that is closest to the first heading estimate vector is identified as the final estimated heading.

Figure 3:
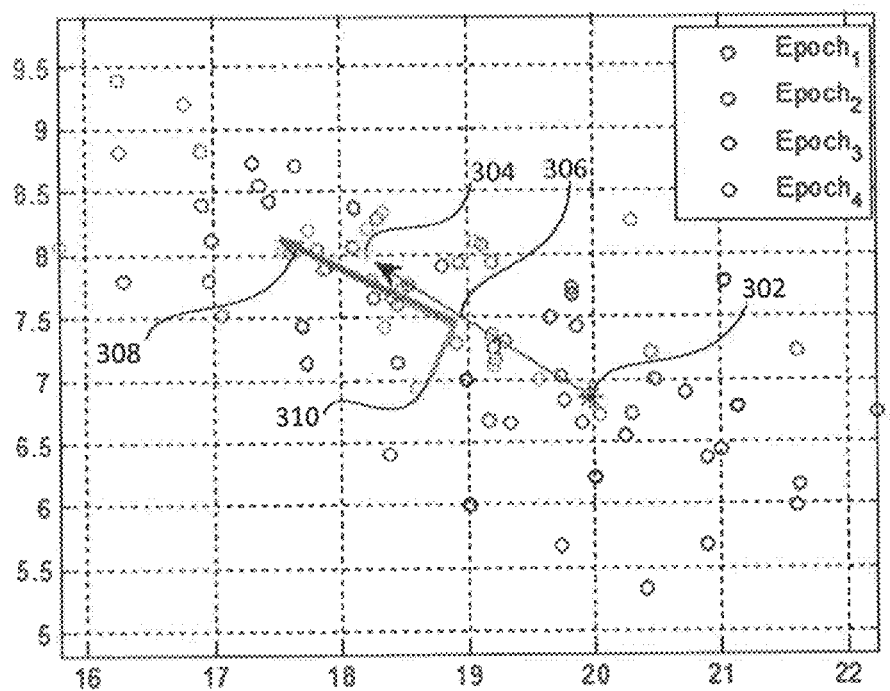
FIG. 3 includes a graphical depiction of detected coordinate clusters for determining heading and velocity of a moving target according to aspects of the present disclosure.

FIG. 3 shows a plot 300 of the x and y coordinates of detections of an object in a position data matrix X representing detections during four cycles, also referred to herein as epochs. An average of detection coordinates during the oldest of the time periods, Epoch 1, was computed and is plotted as $(x,y)_{oldest}$ 302. An average of detection coordinates during the latest of the time periods, Epoch 4, was computed and plotted a point representing as $(x,y)_{latest}$ 304. A first heading estimate vector 306 extends from $(x,y)_{oldest}$ 302 to $(x,y)_{latest}$ 304.

For the four cycles, the major eigenvector and minor eigenvector of M associated with the position data matrices X may also be plotted. According to an aspect of the present disclosure, the direction of the major eigenvector is compared to the direction of the first heading estimate 306. The major eigenvector direction that most closely matches the direction of the first heading estimate is defined as the final estimated heading.

In FIG. 3, the major eigenvector 308 could pointing to either northwest direction or southeast direction. By comparing the major eigenvector 308 with the first heading estimate 306, it is determined that the northwest direction of the eigenvector most closely matches the direction of the first heading estimate 306 and therefore is selected as the final heading estimate. FIG. 3 also shows the minor eigenvector 310 of M. The major eigenvector 308 represents the orientation or major axis of a detected non-point object. The minor eigenvector 310 represents the minor axis of the detected non-point object.

According to another aspect of the present disclosure, the length of the first heading estimate vector 306 can be used as a coarse speed estimate of the non-point object.

The principal component analysis techniques described herein can be more accurate than previously known techniques because they are generally less affected than previous techniques to detrimental effects of outlying data points and partial occlusion of a target object, for example. However, under certain conditions the principle component analysis method of determining the heading of a non-point object as described herein may provide inaccurate results. For example, if the non-point object is located at or very near to a border of a sensor's field of view, the cluster trajectory orientation as represented by eigenvector decomposition of a position data matrix as disclosed herein, may not align with the object's heading. Moreover, some unusually shaped objects or multiple objects moving forward side by side may also be detected in which the cluster trajectory orientation may not align with the object's heading, for example.

According to another aspect of the present disclosure, the disclosed method of detecting an object's heading by the disclosed principal component analysis method may be combined with other estimation algorithms to greatly increase overall performance of an object detection and tracking system.

According to an aspect of the present disclosure, target velocity tracking accuracy may be improved by combining velocity estimates generated using a number of radar processing techniques in which a weight of each technique is determined based on attributes of a detected target or track.

In an illustrative embodiment, according to an aspect of the present disclosure, velocity estimates from three different processing methods may be combined to generate a final velocity estimate of a target. In first processing method, velocity estimates are generated by point target based tracker in a traditional manner. In a second processing method, velocity estimates are generated based on Doppler-azimuth profile, in a traditional manner. In a third processing method, velocity estimates are generated from cluster trajectory orientation using principal component analysis techniques disclosed herein.

In the first processing method, a radar system provides three dimensional information in detections: range, Doppler or range rate, and azimuth or angle. The point object based traditional tracking technique uses all three measurement to estimate velocity. However it does not account for multiple detections from a single object.

In the second processing method, a Doppler-azimuth profile technique is used to estimate velocity of a non-point object. The Doppler-azimuth profile technique assumes the velocity of a detected non-point object is the same at every part of the non-point object. An over-determined linear equation set is then solved to obtain the velocity estimate. However, depending on the position and orientation of the object the linear equation set may be ill-conditioned or nearly ill-conditioned, in which case the estimated velocity will suffer from substantial error.

In the third processing method, the cluster trajectory orientation based heading estimation technique disclosed herein is used to estimate a heading of a detected non-point object. The cluster trajectory orientation based heading estimation technique provides accurate heading measurements for detected non-point object, but may less accurate in circumstances where the heading of the non-point object is not in alignment with the object's orientation, for example.

The later two techniques both assume that a detected target is a non-point object, but these techniques process different information about the non-point object. The Doppler-azimuth profile technique uses Doppler and azimuth to estimate velocity. The cluster trajectory orientation technique estimates heading of a non-point target based on range and azimuth information.

The relative accuracy and usefulness of each of the three processing methods depends on various circumstances. For example, when a non-point object has very small span in azimuth and a very long span in range, the Doppler-azimuth profile technique may suffer from the ill-conditioned equation set. For these circumstances, cluster trajectory orientation based heading estimation technique provides more accurate results. In another example, when a target object is detected at the boarder of a sensor field of view, the cluster trajectory orientation based heading estimation technique may provide substantially biased and inaccurate results. Under these circumstances the Doppler-azimuth profile technique provides more accurate results.

According to an aspect of the present disclosure, a radar system first identifies good, fair and poor conditions for each of the three approaches described above. The radar system then fuses velocity estimates for each of the three approaches together in a manner that weights velocity estimates based on suitability of the corresponding measurement technique for actual measurement conditions during radar detections. The disclosed technique for combining velocity estimates based on favorability of measurement conditions for each of the measurement techniques can be used in various applications where the three techniques apply.

In an illustrative embodiment, estimates generated according to the traditional tracker processing method are assigned a reliability score of 2 for detections where the traditional tracker processing method indicates a high track quality of a detected track corresponding to the estimates. Otherwise, the estimates generated according to the traditional tracker processing method are assigned a reliability score of 1. A predetermined track quality threshold may be used for defining whether to assign a reliability score of 1 or 2 to estimates generated according to the traditional tracker processing method, for example.

In the illustrative embodiment, estimates generated according to the Doppler-Azimuth profile processing method are assigned a reliability score of 0 when a number of detections is less than a predetermined minimum number, or the azimuth span of a detection is less than a predetermined minimum threshold.

When the number of detections is more than a predetermined large number, and the azimuth span of the detection is more than a predetermine large threshold, a reliability score of 2 is assigned to estimates generated according to the Doppler-Azimuth profile processing method.

For other cases, estimates generated according to the Doppler-Azimuth profile processing method are assigned a reliability score of 1.

In the illustrative embodiment, estimates generated according to the cluster trajectory orientation processing method disclosed herein are assigned a reliability score of 0 if a number of detections is less than a predetermined minimum number, or if the detected object is stationary, or if a ratio of the largest eigenvalue to the smallest eigenvalue is less than a predetermined minimum threshold, or if radar cluster is too close to the sensor FOV.

If a number of detections is more than a predetermined large number, the object is not stationary, the ratio of the largest eigenvalue to the smallest eigenvalue is more than a predetermined large threshold, and the cluster is not too close to the sensor FOV, then a reliability score of 2 is assigned to estimates generated according to the cluster trajectory orientation processing method disclosed herein. Under other circumstances, estimates generated according to the cluster trajectory orientation processing method disclosed herein assigned a reliability score of 1.

Although the cluster trajectory orientation processing method disclosed herein provides a heading estimate instead of a velocity estimate, a target's velocity can be calculated by combining the heading estimate generated by the cluster trajectory orientation processing method with velocity estimates generated by one of the other two processing methods described above. According to this aspect of the present disclosure, x and y components of an estimated velocity for the trajectory orientation processing method are computed using equation 3 and equation 4. In equation 3 and equation 4, x and y components of the velocity estimate generated by one of the other two processing methods are denoted as $v_x$ and $v_y$, respectively, and x and y components of the heading estimate generated by the trajectory orientation processing method are denoted as $h_x$ and $h_y$, respectively.

$$\frac{(v_x h_x + v_y h_y)}{h_x^2 + h_y^2} h_x, \quad \text{Equation 3.}$$

$$\frac{(v_x h_x + v_y h_y)}{h_x^2 + h_y^2} h_y, \quad \text{Equation 4.}$$

According to an aspect of the present disclosure, if only one of the three processing methods result in estimates that are assigned a non-zero reliability score, then the velocity estimate based on that approach is selected and designated as the final velocity estimate. In this case the selected velocity estimate would be based on the traditional tracker processing method which generates estimates that are assigned non-zero reliability scores in each case.

According to another aspect of the present disclosure, if two of the three processing methods result in estimates that are assigned a non-zero reliability score, then the velocity estimates generated by those two processing methods are combined.

If the two non-zero fuse scores are identical, then a final velocity estimate is generated by averaging the two estimates having been assigned non-zero fuse scores. If the two non-zero fuse scores are not identical, i.e., one approach has a reliability score of 2, and the other has a reliability score of 1, the final velocity estimate is generated by computing a weighted average of the two estimates having been assigned non-zero reliability scores. In the computation of the weighted average, the estimate having been assigned the higher reliability score is given greater weight.

Figure 4:
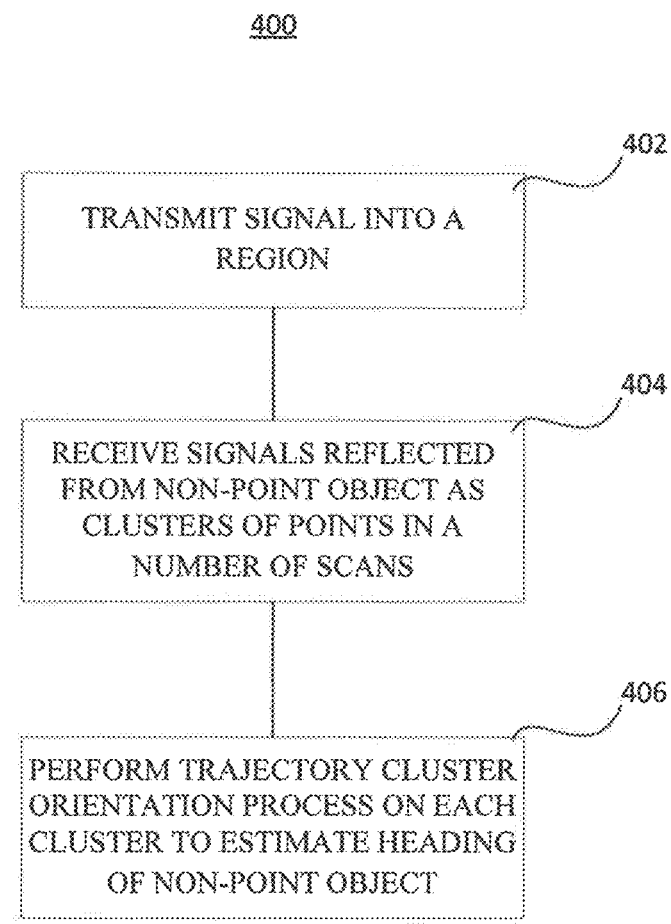
FIG. 4 includes a process flow diagram describing for characterizing a moving object detected by a radar system according to aspects of the present disclosure.

A method for characterizing a moving object detected by a radar system according to aspects of the present disclosure is described with reference to FIG. 4. At block 402, the method includes transmitting transmitted signals into a region. At block 404, the method includes receiving reflected signals generated by reflection of the transmitted signals from a plurality of points on the moving target and generating receive signals indicative of the reflected radar signals. The plurality of points define a cluster of points for each of a plurality of scans.

At block 406, the method includes receiving the receive signals and performing a cluster trajectory orientation process associated with the clusters of points to estimate the heading of the moving target. The cluster trajectory orientation process is described with reference to FIG. 5.

Figure 5:
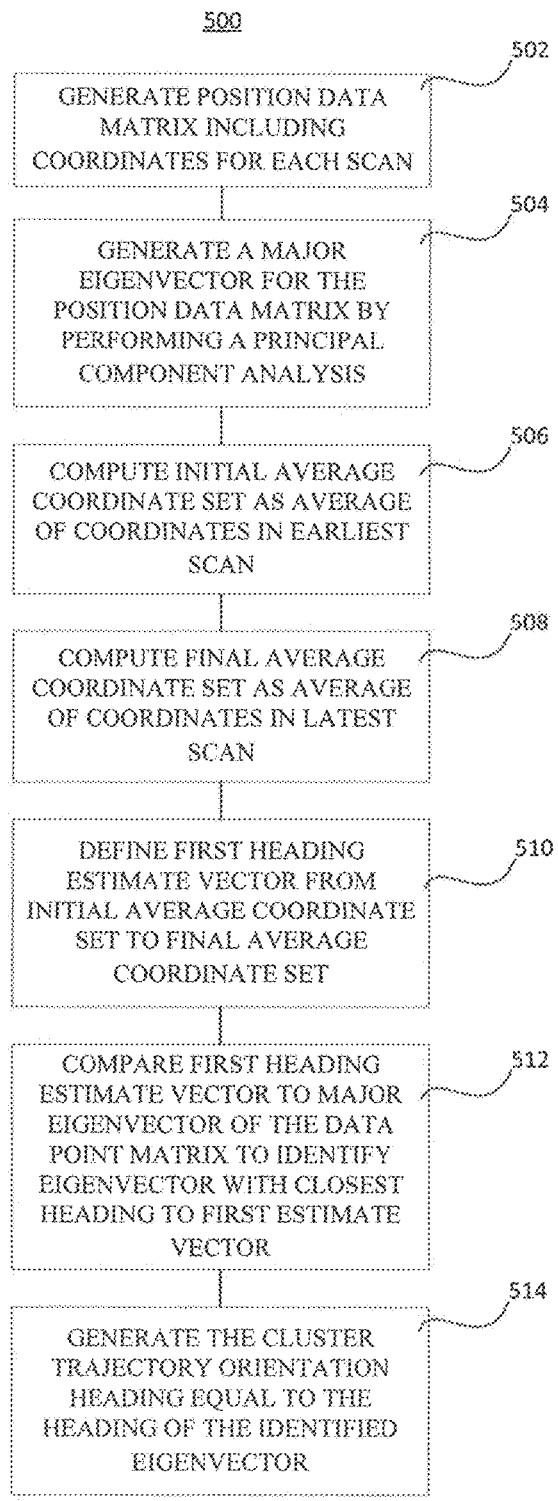
FIG. 5 includes a process flow diagram describing a cluster trajectory orientation process according to an aspect of the present disclosure.

Referring FIG. 5, according to aspects of the present disclosure, the cluster trajectory orientation process 500 includes generating a position data matrix including coordinates of each point in the corresponding cluster of points for of the K scans at block 502. At block 504, the cluster trajectory orientation process includes generating a corresponding major eigenvector by performing a principal component analysis on the corresponding position data matrix of the K scans. At block 506, an initial average coordinate set is computed as an average of the coordinates in the position data matrix corresponding to an earliest one of the K of scans. At block 508, final average coordinate set is computed as an average of the coordinates in the position data matrix corresponding to a latest one of the K of scans.

At block 510, a first heading estimate vector extending from the initial average coordinate set to the final average coordinate set is defined. At block 512 the first heading estimate vector is compared to the major eigenvector corresponding to M to identify a selected direction that most closely matches a heading estimate vector direction of the first heading estimate vector. At block 514, the selected direction of the major eigenvector is generated as a cluster trajectory orientation heading estimate.

In an illustrative embodiment, according to an another aspect of the present disclosure, the method 400 for characterizing a moving object detected by a radar system as described with reference to FIG. 4 also includes combining three estimated velocities of the moving target to determine the velocity of the moving target. In this embodiment, the three velocities include a first velocity generated from a point target based tracking process, a second velocity generated from a Doppler-azimuth profile process and a third velocity generated based on the cluster trajectory orientation process.

Figure 6:
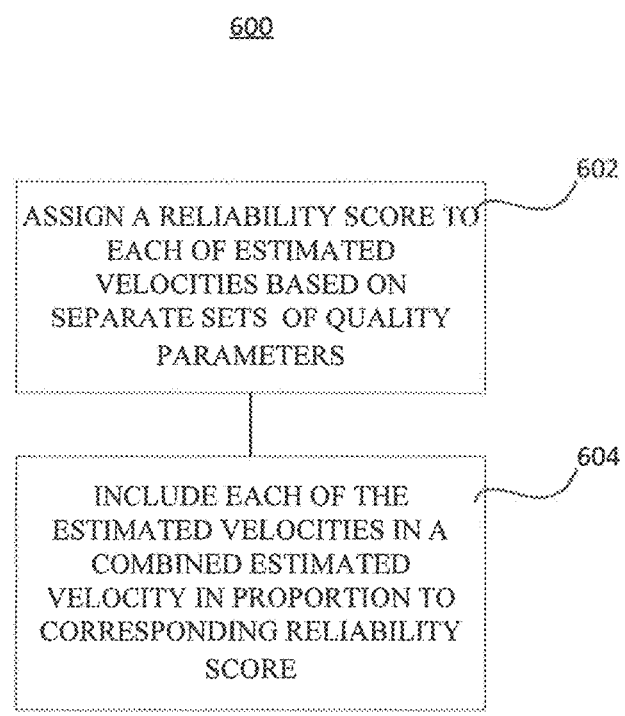
FIG. 6 includes a process flow diagram describing a method of combining the estimated velocities generated by different radar processing methods according to an aspect of the present disclosure.

The method of combining the three estimated velocities according to an aspect of the present disclosure is described with reference to FIG. 6. Referring to FIG. 6, the method 600 includes assigning a reliability score to each of the three estimated velocities based on a separate set of quality parameters for each of the three processes generating the three estimated velocities at block 602. At block 604, the method includes including each of the three estimated velocities in a combined estimated velocity in proportion to their reliability score.

In an illustrative embodiment, a first set of quality parameters used for determining the reliability score for the estimated velocity generated by the point based target tracking process includes a quality measure of a track detected by the point based target tracking process, and a second set of quality parameters used for determining the reliability score for the estimated velocity generated by the Doppler-azimuth profile process includes a number of detections used in the Doppler-azimuth process and an azimuth span of detections by the Doppler-azimuth process. In the illustrative embodiment, a third set of quality parameters used for the determining the reliability score for the estimated velocity generated based on the cluster trajectory orientation process includes a number of detections used in the trajectory orientation process, a detection of a stationary object by the trajectory orientation process, a ratio of eigenvalues of the position data matrices, and proximity of clutter to a sensor field of view.

According to an aspect of the present disclosure, the estimated velocity generated based on the cluster trajectory orientation process is determined by combination of the cluster trajectory orientation heading estimate with the first velocity generated from the point target based tracking process or the second velocity generated from a Doppler-azimuth profile process.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. For example, although the various aspects and illustrative embodiments described herein may be described with reference to radar systems and signals, it should be understood that the disclosed system and method similarly includes corresponding aspects of other object detection systems such as LIDAR, for example. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A system for characterizing a moving object, the system comprising:
    a signal transmitter for transmitting transmitted signals into a region;
    a receiver for receiving reflected signals generated by reflection of the transmitted signals from a plurality of points on the moving target and generating receive signals indicative of the reflected radar signals, the plurality of points defining a cluster of points for each of a plurality of scans; and
    a processor receiving the receive signals and performing a cluster trajectory orientation process associated with the clusters of points to estimate the heading of the moving target, wherein the cluster trajectory orientation process comprises:
        generating a position data matrix including coordinates of each point in the corresponding cluster of points;
        generating a major eigenvector by performing a principal component analysis on the position data matrix;
        computing an initial average coordinate set as an average of the coordinates in the position data matrix corresponding to an earliest one of the plurality of scans;
        computing a final average coordinate set as an average of the coordinates in the position data matrix corresponding to a latest one of the plurality of scans;
        defining a first heading estimate vector extending from the initial average coordinate set to the final average coordinate set;
        comparing the first heading estimate vector to the major eigenvector of the position data matrix to identify a selected direction of the major eigenvector that most closely matches a heading estimate vector direction of the first heading estimate vector; and
        generating as a cluster trajectory orientation heading estimate the selected direction of the major eigenvector.

2. The system of claim 1, further comprising:
    the processor combining three estimated velocities of the moving target to determine the velocity of the moving target, the three velocities comprising a first velocity generated from a point target based tracking process, a second velocity generated from a Doppler-azimuth profile process and a third velocity generated based on the cluster trajectory orientation process.

3. The system of claim 2, further wherein the combining comprises:
    assigning a reliability score to each of the three estimated velocities based on a separate set of quality parameters for each of the three processes generating the three estimated velocities; and
    including each of the three estimated velocities in a combined estimated velocity in proportion to their reliability score.

4. The system of claim 3, wherein a first set of quality parameters used for determining the reliability score for the estimated velocity generated by the point based target tracking process comprises a quality measure of a track detected by the point based target tracking process.

5. The system of claim 4, wherein a second set of quality parameters used for determining the reliability score for the estimated velocity generated by the Doppler-azimuth profile process comprises a number of detections used in the Doppler-azimuth process and an azimuth span of detections by the Doppler-azimuth process.

6. The system of claim 5, wherein a third set of quality parameters used for the determining the reliability score for the estimated velocity generated based on the cluster trajectory orientation process comprises a number of detections used in the trajectory orientation process, a detection of a stationary object by the trajectory orientation process, a ratio of eigenvalues of the position data matric, and proximity of clutter to a sensor field of view.

7. The system of claim 3 wherein the estimated velocity generated based on the cluster trajectory orientation process is determined by combination of the cluster trajectory orientation heading estimate with the first velocity generated from the point target based tracking process or the second velocity generated from a Doppler-azimuth profile process.

8. A system for determining heading and velocity of a moving target, comprising:
    a signal transmitter for transmitting transmitted signals into a region;
    a receiver for receiving reflected signals generated by reflection of the transmitted signals from a plurality of points on the moving target and generating receive signals indicative of the reflected radar signals, the plurality of points defining a cluster of points for each of a plurality of scans; and
    a processor receiving the receive signals and using a cluster trajectory orientation process associated with the cluster of points to estimate the heading of the moving target and combining three estimated velocities of the moving target to determine the velocity of the moving target, the three velocities comprising a first velocity generated from a point target based tracking process, a second velocity generated from a Doppler-azimuth profile process and a third velocity generated based on the cluster trajectory orientation process.

9. The system of claim 8, wherein the cluster trajectory orientation process comprises:
    generating a position data matrix including coordinates of each point in the corresponding cluster of points;
    generating a corresponding major eigenvector by performing a principal component analysis on the corresponding position data matrix;
    computing an initial average coordinate set as an average of the coordinates in the position data matrix corresponding to an earliest one of the plurality of scans;
    computing a final average coordinate set as an average of the coordinates in the position data matrix corresponding to a latest one of the plurality of scans;
    defining a first heading estimate vector extending from the initial average coordinate set to the final average coordinate set;
    comparing the first heading estimate vector to the major eigenvector of the position data matrix to identify a selected direction of the major eigenvectors that most closely matches a heading estimate vector direction of the first heading estimate vector; and
    generating as a cluster trajectory orientation heading estimate the selected direction of the major eigenvector.

10. The system of claim 9 wherein the third velocity generated based on the cluster trajectory orientation process is determined by combination of the cluster trajectory orientation heading estimate with the first velocity generated from the point target based tracking process or the second velocity generated from a Doppler-azimuth profile process.

11. A method for characterizing a moving object detected by a radar system, the method comprising:
   transmitting transmitted signals into a region;
   receiving reflected signals generated by reflection of the transmitted signals from a plurality of points on the moving target and generating receive signals indicative of the reflected radar signals, the plurality of points defining a cluster of points for each of a plurality of scans; and
   receiving the receive signals and performing a cluster trajectory orientation process associated with the clusters of points to estimate the heading of the moving target, wherein the cluster trajectory orientation process comprises:
      generating a position data matrix including coordinates of each point in the corresponding cluster of points;
      generating a corresponding major eigenvector by performing a principal component analysis on the corresponding position data matrix;
      computing an initial average coordinate set as an average of the coordinates in the position data matrix corresponding to an earliest one of the plurality of scans;
      computing a final average coordinate set as an average of the coordinates in the position data matrix corresponding to a latest one of the plurality of scans;
      defining a first heading estimate vector extending from the initial average coordinate set to the final average coordinate set;
      comparing the first heading estimate vector to the major eigenvector of the position data matrix to identify a selected direction of the major eigenvectors that most closely matches a heading estimate vector direction of the first heading estimate vector; and
      generating as a cluster trajectory orientation heading estimate the selected direction of the major eigenvector.

12. The method of claim 11, further comprising:
   combining three estimated velocities of the moving target to determine the velocity of the moving target, the three velocities comprising a first velocity generated from a point target based tracking process, a second velocity generated from a Doppler-azimuth profile process and a third velocity generated based on the cluster trajectory orientation process.

13. The method of claim 12, further wherein the combining comprises:
   assigning a reliability score to each of the three estimated velocities based on a separate set of quality parameters for each of the three processes generating the three estimated velocities; and
   including each of the three estimated velocities in a combined estimated velocity in proportion to their reliability score.

14. The method of claim 13, wherein a first set of quality parameters used for determining the reliability score for the estimated velocity generated by the point based target tracking process comprises a quality measure of a track detected by the point based target tracking process.

15. The method of claim 14, wherein a second set of quality parameters used for determining the reliability score for the estimated velocity generated by the Doppler-azimuth profile process comprises a number of detections used in the Doppler-azimuth process and an azimuth span of detections by the Doppler-azimuth process.

16. The method of claim 15, wherein a third set of quality parameters used for the determining the reliability score for the estimated velocity generated based on the cluster trajectory orientation process comprises a number of detections used in the trajectory orientation process, a detection of a stationary object by the trajectory orientation process, a ratio of eigenvalues of the position data matrices, and proximity of clutter to a sensor field of view.

17. The method of claim 13 wherein the estimated velocity generated based on the cluster trajectory orientation process is determined by combination of the cluster trajectory orientation heading estimate with the first velocity generated from the point target based tracking process or the second velocity generated from a Doppler-azimuth profile process.

18. A method for determining heading and velocity of a moving target, comprising:
   transmitting transmitted signals into a region;
   receiving reflected signals generated by reflection of the transmitted signals from a plurality of points on the moving target and generating receive signals indicative of the reflected radar signals, the plurality of points defining a cluster of points for each of a plurality of scans; and
   receiving the receive signals and using a cluster trajectory orientation process associated with the cluster of points to estimate the heading of the moving target and combining three estimated velocities of the moving target to determine the velocity of the moving target, the three velocities comprising a first velocity generated from a point target based tracking process, a second velocity generated from a Doppler-azimuth profile process and a third velocity generated based on the cluster trajectory orientation process.

19. The method of claim 18, wherein the cluster trajectory orientation process comprises:
   generating a position data matrix including coordinates of each point in the corresponding cluster of points;
   generating a corresponding major eigenvector by performing a principal component analysis on the corresponding position data matrix;
   computing an initial average coordinate set as an average of the coordinates in the position data matrix corresponding to an earliest one of the plurality of scans;
   computing a final average coordinate set as an average of the coordinates in the position data matrix corresponding to a latest one of the plurality of scans;
   defining a first heading estimate vector extending from the initial average coordinate set to the final average coordinate set;
   comparing the first heading estimate vector to the major eigenvector the position data matrix to identify a selected direction of the major eigenvectors that most closely matches a heading estimate vector direction of the first heading estimate vector; and
   generating as a cluster trajectory orientation heading estimate the selected direction of the major.

20. The method of claim 19 wherein the third velocity generated based on the cluster trajectory orientation process is determined by combination of the cluster trajectory orientation heading estimate with the first velocity generated from the point target based tracking process or the second velocity generated from a Doppler-azimuth profile process.

* * * * *